United States Patent
Challita et al.

(10) Patent No.: US 12,386,017 B2
(45) Date of Patent: Aug. 12, 2025

(54) DETERMINING LOCATION INFORMATION ABOUT A DRONE

(71) Applicant: Telefonaktiebolaget LM Ericsson (PUBL), Stockholm (SE)

(72) Inventors: Ursula Challita, Solna (SE); Henrik Rydén, Stockholm (SE); Sakib Bin Redhwan, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 217 days.

(21) Appl. No.: 17/907,892

(22) PCT Filed: Mar. 3, 2020

(86) PCT No.: PCT/SE2020/050236
§ 371 (c)(1),
(2) Date: Aug. 29, 2022

(87) PCT Pub. No.: WO2021/177867
PCT Pub. Date: Sep. 10, 2021

(65) Prior Publication Data
US 2023/0129005 A1 Apr. 27, 2023

(51) Int. Cl.
*G01S 5/00* (2006.01)
*B64D 45/00* (2006.01)
(Continued)

(52) U.S. Cl.
CPC .......... *G01S 5/02521* (2020.05); *B64D 45/00* (2013.01); *G01S 5/0036* (2013.01);
(Continued)

(58) Field of Classification Search
CPC ............... G01S 5/02521; G01S 5/0036; G01S 2205/03; B64C 39/024; B64D 45/00; H04W 64/00
(Continued)

(56) References Cited

U.S. PATENT DOCUMENTS 10,466,700 B1 * 11/2019 Carmack .............. G08G 5/0069
11,798,423 B2 * 10/2023 Lee ........................ H04W 4/40
(Continued)

FOREIGN PATENT DOCUMENTS

CN 109792275 A 5/2019

OTHER PUBLICATIONS

PCT Notification of Transmittal of the International Search Report and the Written Opinion of the International Searching Authority, or the Declaration issued for International application No. PCT/SE2020/050236—Jan. 18, 2021.
(Continued)

*Primary Examiner* — Tiffany P Young
*Assistant Examiner* — Michael T Dowling
(74) *Attorney, Agent, or Firm* — Baker Botts L.L.P.

(57) ABSTRACT

A computer implemented method in a communications network for determining location information about an actual location of a drone comprises obtaining a reported location of the drone at a first time point and obtaining a measurement of radio conditions between the drone and a node in the telecommunications network, at the first time point. The method then comprises predicting radio conditions at one or more locations related to the reported location of the drone, and determining the location information about the actual location of the drone based on the measured radio conditions and the predicted radio conditions.

17 Claims, 7 Drawing Sheets

(51) Int. Cl.
   *G01S 5/02* (2010.01)
   *H04W 64/00* (2009.01)
(52) U.S. Cl.
   CPC ......... *H04W 64/00* (2013.01); *B64U 2201/20* (2023.01); *G01S 2205/03* (2020.05)
(58) Field of Classification Search
   USPC .......................................................... 701/492
   See application file for complete search history.

(56) References Cited

U.S. PATENT DOCUMENTS

| | | | |
|---|---|---|---|
| 2008/0183344 A1* | 7/2008 | Doyen | G08G 5/0082 701/9 |
| 2013/0321424 A1 | 12/2013 | Pylappan et al. | |
| 2015/0236779 A1 | 8/2015 | Jalali | |
| 2016/0371985 A1 | 12/2016 | Kotecha | |
| 2019/0004144 A1 | 1/2019 | O'Shea et al. | |
| 2019/0278302 A1 | 9/2019 | Sundaresan et al. | |
| 2020/0043348 A1* | 2/2020 | Ghosh | G01C 21/005 |
| 2022/0292867 A1* | 9/2022 | Zhang | G06T 7/73 |

OTHER PUBLICATIONS

Extended European Search Report issued for Application No./Patent No. 20923496.2-1206 / 4115207 PCT/SE2020050236—Mar. 16, 2023.

Official Action issued for Chinese Application Serial No. 202080100468.1—Sep. 26, 2024.

Search Report issued for Chinese Patent Application Serial No. 2020801004681—Sep. 26, 2024.

* cited by examiner

DETERMINING LOCATION INFORMATION ABOUT A DRONE

PRIORITY

This nonprovisional application is a U.S. National Stage Filing under 35 U.S.C. § 371 of International Patent Application Serial No. PCT/SE2020/050236 filed Mar. 3, 2020 and entitled "DETERMINING LOCATION INFORMATION ABOUT A DRONE" which is hereby incorporated by reference in its entirety.

TECHNICAL FIELD

This disclosure relates to methods, nodes and systems in a communications network. More particularly but non-exclusively, the disclosure relates to determining location information about the actual location of a drone.

BACKGROUND

Enhanced Long Term Evolution (LTE) support for drones is currently a research area of interest (see, RAN #75 entitled "Study on E-UTRA and E-UTRAN enhancements for Aerial Vehicles" dated Mar. 6-9, 2017). For example, whether drones can be served using LTE network deployments with base station antennas targeting terrestrial coverage to support Release 14 functionality.

A drone (or air-borne user equipment, UE) may experience radio propagation characteristics that are likely to be different from those experienced by a UE on the ground. As long as a drone is flying at a low altitude, relative to the base station (BS) antenna height, it behaves like a conventional UE on the ground. However, once a drone is flying above the BS antenna height, the uplink (UL) signal from the drone becomes visible to multiple cells due to line-of-sight propagation conditions. The UL signal from a drone may increase interference in neighbouring cells and the increased interference can have a negative impact on UEs on the ground, e.g. smartphones, IoT devices, etc. Similarly, the line-of-sight conditions to multiple cells can lead to higher downlink (DL) interference to the drone.

Furthermore, as BS antennas are tilted downward, on the ground or below the BS antenna height, drones are likely served by the main lobes of the BS antennas. However, when a drone is flying above the boresight, it is more likely to be served by the side or back lobes of the BS antennas, which have reduced antenna gains compared to the antenna gain of the main lobe.

NR Beamforming: Multi-antenna techniques can increase the signal quality. By spreading the total transmission power over multiple antennas, an array gain can be achieved which increases the signal quality. The transmitted signal from each antenna is formed in such way that the received signal from each antenna adds up coherently to the user, this is referred to as beam-forming. The precoding describes how to form each antenna in the antenna array in order to form a "beam". Use of beamforming is one cornerstone in the NR technology, and beams can be shaped both in the horizontal or vertical domain using the new advanced antenna systems. A UE or drone can, for example, assess beam qualities in NR from the serving or neighboring cell via measurements on the Synchronization Signal Block (SSB), or via measurement on the Channel State Information Reference Signal (CSI-RS) resources.

RSRP Report: Reference Signal Received Power (RSRP) is a UE measurement where the UEs in the network are assumed to send RSRP measurement reports, containing L3-measurements of the RSRP values of the serving cell and up to eight neighboring cells on the primary carrier in LTE context. RSRP values can in NR context be reported by UE measurement on the SSB or CSI-RS.

Drone Trajectory Report: A Drone trajectory report was introduced in Rel. 15 [36.331], having the following format:

```
FlightPathInfoReport-r15 ::=      SEQUENCE {
    flightPath-r15 SEQUENCE (SIZE (1..maxWayPoint-r15)) OF WayPointLocation-r15    OPTIONAL,
    nonCriticalExtension              SEQUENCE { }                   OPTIONAL
}
WayPointLocation-r15 ::=         SEQUENCE {
    wayPointLocation-r15                  LocationInfo-r10,
    timeStamp-r15                         AbsoluteTimeInfo-r10       OPTIONAL
}
--ASN1STOP
```

Capable drones with future location information available can report their flight path during connection setup. The report contains a sequence of location-information elements with corresponding time-stamps.

SUMMARY

Drones registered in (or comprised in) a communications network can intentionally report false locations to the network. This may be for a variety of reasons, including, for example: to disrupt the ground communication network by causing high interference in the uplink by flying at specific locations; in order to fly in "no fly" zones such as airports (a drone may do this, for example, to disrupt the communications network in such zones, or in order to capture sensitive videos); flying at an altitude below or above regulatory limits (a drone may want to travel at different altitudes for better received signal quality, for instance); flying at a speed above the maximum allowed speed limit; or simply in order to be able to fly over an illegal area to reach its destination faster (e.g. to take a shortcut).

As well as intentionally reporting an incorrect location to the network, a drone may unintentionally (e.g. unknowingly) deviate from its reported location route or report an inaccurate location, for example, due to inaccurate Global Navigation Satellite System (GNSS) location data. This may happen, for example due to jammers, or canyoning effects with high-rise buildings. This is illustrated in FIG. 1 whereby a drone 104 reports its location to one or more nodes 102 as being along the dotted flight path 106 at the times t_1-t_N, whilst actually flying at a higher altitude along the flight path 108.

It is an object of embodiments herein to be able to detect when a drone is reporting an inaccurate location and/or determine the correct location of a drone.

It is further an object of embodiments herein to provide improved connectivity and positioning services to drones in LTE deployments, for example, using existing Rel.15 signalling.

Thus according to a first aspect herein there is provided a computer implemented method in a communications network for determining location information about an actual location of a drone. The method comprises obtaining a reported location of the drone at a first time point and obtaining a measurement of radio conditions between the drone and a node in the telecommunications network, at the first time point. The method then comprises predicting radio conditions at one or more locations related to the reported location of the drone, and determining the location information about the actual location of the drone based on the measured radio conditions and the predicted radio conditions.

In this way, predicted radio conditions in the vicinity of a reported drone location may be compared to the actual radio conditions measured between the drone and a node in the telecommunications network in order to determine information about the actual location of the drone. In some embodiments, the measured radio conditions at the location of the drone can be compared to the conditions that we would expect (e.g. predict) if the drone were actually at the location it had reported. If the predicted radio conditions match the measured conditions then it is likely that the drone is at the location that it reported. If the measured conditions do not match what is expected/predicted then this may provide an indication that the drone is not actually at the location that it has reported. The actual location information may comprise, for example, the actual location of the drone, the actual flight path of the drone and/or an indication of whether the drone has deviated from its reported flight path.

According to a second aspect there is a node in a communications network for determining location information about an actual location of a drone, wherein the node comprises a memory comprising instruction data representing a set of instructions, and a processor configured to communicate with the memory and to execute the set of instructions, wherein the set of instructions, when executed by the processor, cause the processor to: obtain a reported location of the drone at a first time point and obtain a measurement of radio conditions between the drone and a node in the telecommunications network, at the first time point. The node is further caused to predict radio conditions at one or more locations related to the reported location of the drone, and determine the location information about the actual location of the drone based on the measured radio conditions and the predicted radio conditions.

According to a third aspect there is a computer program product comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

Figure 1:
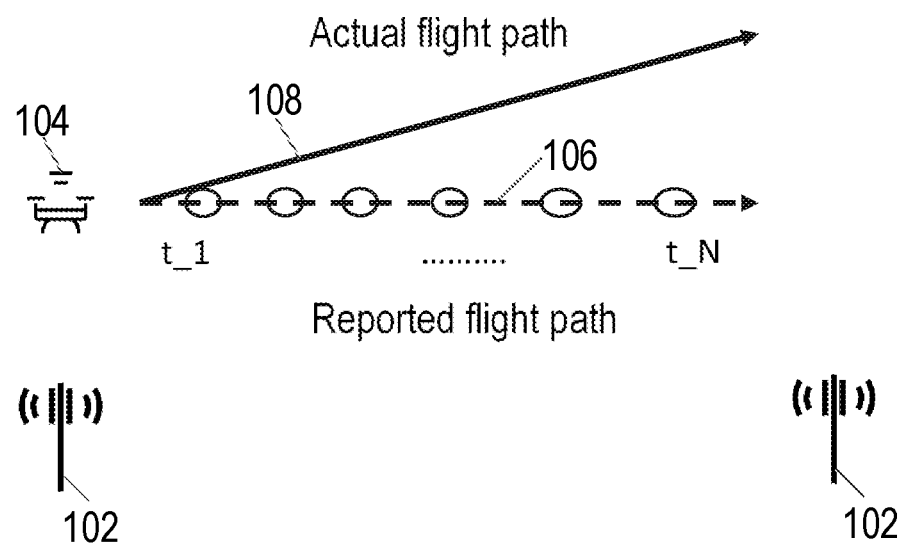
FIG. 1 illustrates an example of a drone deviating from a reported flight path.
Figure 2:
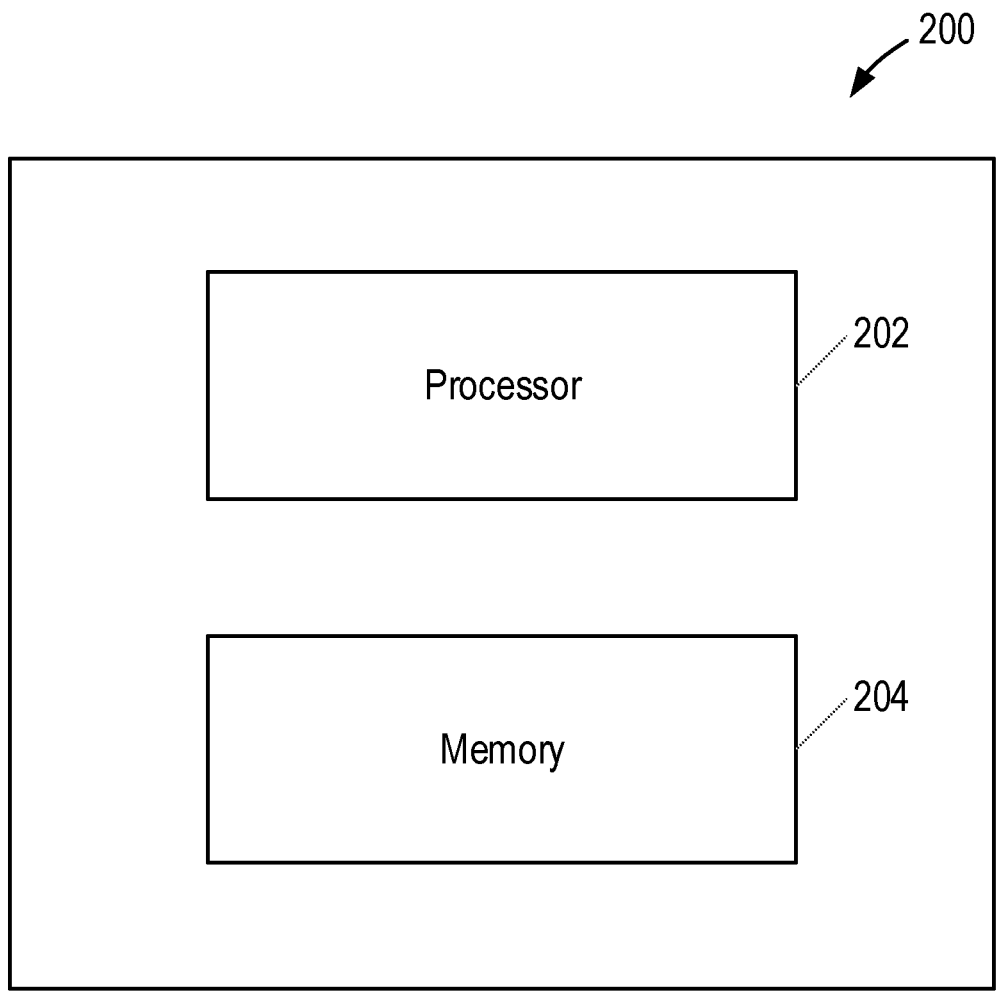
FIG. 2 illustrates an example node according to some embodiments herein.

FIG. 2 illustrates a node 200 in a communications network according to some embodiments herein. The node 200 may be configured (e.g. adapted or programmed) to perform any of the embodiments of the method 300 as described below.

Generally, a communications network (or telecommunications network) may comprise any one, or any combination of: a wired link (e.g. ASDL) or a wireless link such as New Radio (NR) Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links.

Generally, the node 200 may comprise or be comprised in any component or network function (e.g. any hardware or software module) in the communications network suitable for performing the functions described herein. For example, a node may comprise equipment capable, configured, arranged and/or operable to communicate directly or indirectly with a drone (otherwise known as an aerial vehicle or aerial user equipment) and/or with other network nodes or equipment in the communications network to enable and/or provide wireless or wired access to the drone and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 200 may be configured or operative to perform the methods and functions described herein, such as the method 300 described below. The node 200 may comprise a processor (e.g. processing circuitry or logic) 202. It will be appreciated that the node 200 may comprise one or more virtual machines running different software and/or processes. The node 200 may therefore comprise one or more servers, switches and/or storage devices and/or may comprise cloud computing infrastructure or infrastructure configured to perform in a distributed manner, that runs the software and/or processes.

The processor 202 may control the operation of the node 200 in the manner described herein. The processor 202 can comprise one or more processors, processing units, multi-core processors or modules that are configured or programmed to control the node 200 in the manner described herein. In particular implementations, the processor 202 can comprise a plurality of software and/or hardware modules that are each configured to perform, or are for performing, individual or multiple steps of the functionality of the node 200 as described herein.

The node 200 may comprise a memory 204. In some embodiments, the memory 204 of the node 200 can be configured to store program code or instructions that can be executed by the processor 202 of the node 200 to perform the functionality described herein. Alternatively or in addition, the memory 204 of the node 200, can be configured to store any requests, resources, information, data, signals, or similar that are described herein. The processor 202 of the node 200 may be configured to control the memory 204 of the node 200 to store any requests, resources, information, data, signals, or similar that are described herein.

It will be appreciated that the node 200 may comprise other components in addition or alternatively to those indicated in FIG. 2. For example, in some embodiments, the node 200 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 202 of node 200 may be configured to control such a communications interface to transmit to and/or receive from other nodes or network functions requests, resources, information, data, signals, or similar.

In brief, the processor 202 is configured to communicate with the memory and to execute a set of instructions (e.g. computer code). The set of instructions, when executed by the processor, cause the processor to: obtain a reported location of the drone at a first time point; obtain a measurement of radio conditions between the drone and a node in the telecommunications network, at the first time point; predict radio conditions at one or more locations related to the reported location of the drone; and determine the location information about the actual location of the drone based on the measured radio conditions and the predicted radio conditions.

Figure 3:
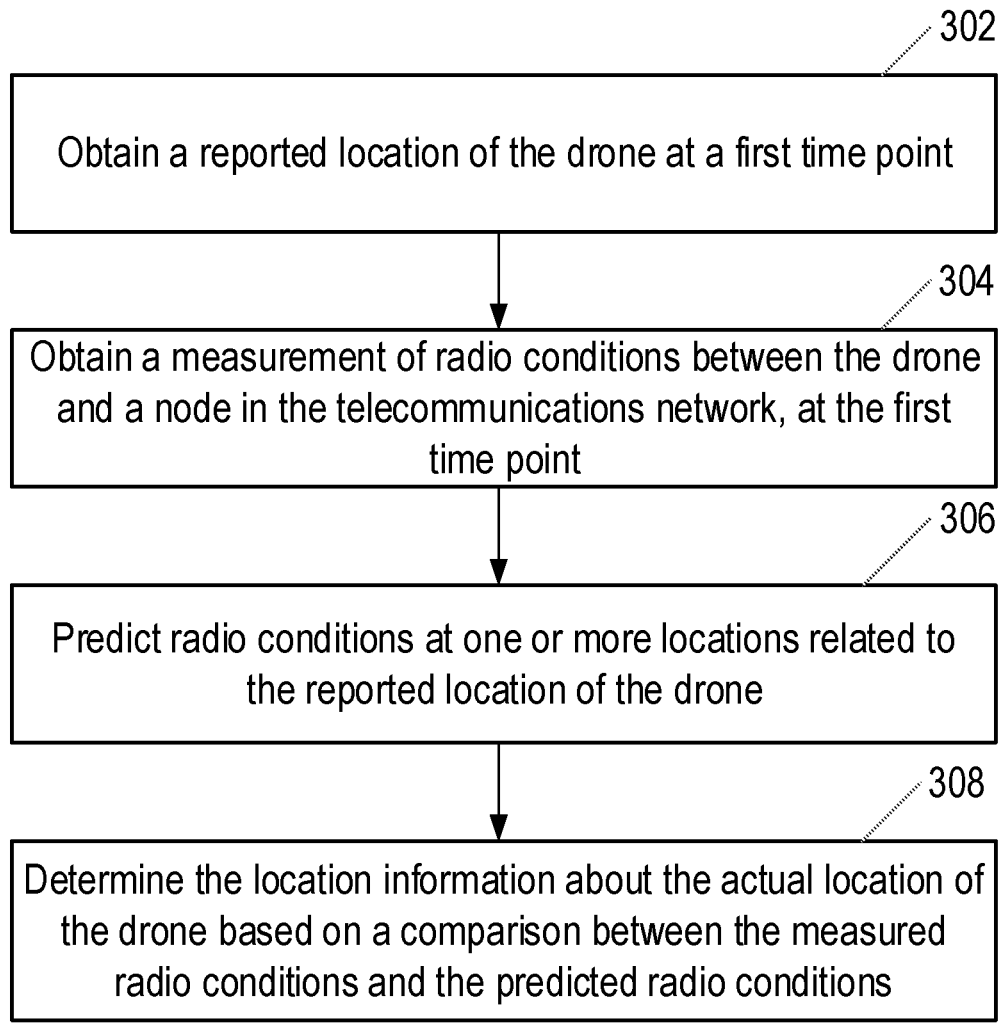
FIG. 3 illustrates an example method according to some embodiments herein.

FIG. 3 illustrates a computer implemented method 300 in a communications network for determining location information about an actual location of a drone according to some embodiments herein. The method 300 may be performed by the node 200 as described above. For example, the processor 202 may be caused or further be caused to perform any of the steps or operations described in connection with any of the embodiments of the method 300 as described below. In other embodiments, the method may be performed centrally, for example, in a distributed or cloud-based manner.

Briefly, in a first step 302 the method 300 comprises obtaining a reported location of the drone at a first time point. In a second step 304 the method comprises obtaining a measurement of radio conditions between the drone and a node in the telecommunications network, at the first time point. In a third step 306 the method comprises predicting radio conditions at one or more locations related to the reported location of the drone, and in a fourth step 308, the method comprises determining the location information about the actual location of the drone based on the measured radio conditions and the predicted radio conditions.

In more detail, a drone may comprise any wireless device that is capable of flight that is further capable of being connected to a communications network. Examples of drones include, but are not limited to an aerial vehicle, an air-borne user equipment (UE), or aerial based equipment (aerial camera, sensor or other equipment). The skilled person will be familiar with such drones and others for which it is desirable to have accurate location information.

In step 302 the method comprises obtaining a reported location of the drone at a first time point. The reported location may be obtained directly or indirectly from the drone. For example, the drone may report its location at a first time point (e.g. time instance or time interval). The drone may report its location using, for example, the drone trajectory report as illustrated in the background section of this document. In some embodiments, the drone may report its location responsive to a network node (such as the network node 200) requesting flight path information from the drone.

The obtained reported location may comprise a time-stamped location or a series (e.g. sequence of) time-stamped reported locations. The reported location may be comprised in flight path information from the drone, a flight path may comprise locations with associated time stamps (1 . . . N).

As described above, the reported location may or may not accurately reflect the actual location of the drone. For example, a drone may have been configured to deliberately report an inaccurate location. This may be to enable the drone, for example, to stay connected to the network whilst flying in a no-fly zone or prohibited zone. A drone may also unintentionally report an inaccurate location, for example, due to inaccurate GNSS location data. This may happen, for example due to jammers, or canyoning effects with high-rise buildings. The nodes and methods herein may be used to determine whether a drone is reporting inaccurate location data, or has strayed from its reported flight path. Some embodiments herein achieve this using standard reported channel measurements (e.g. without necessarily incurring additional signalling overhead).

In step 304 a measurement of radio conditions between the drone and a node in the telecommunications network is obtained, at the first time point. In other words, radio conditions are measured or estimated between the drone and the node at (approximately) the same time instance that the drone reported its location e.g. at the same time as the time-stamp on the reported location obtained in step 302.

It will be appreciated by the skilled person that the measurement of the radio conditions does not need to be made at exactly the first time point (e.g. exactly the same point in time as the reported location of the drone was made). For example, the radio conditions may be obtained at a time point approximately equal to that at which the drone reported its location; for example, the radio conditions may be measured at a time point adjacent to (e.g. slightly before or slightly after) the first time point, or in a time window overlapping, adjacent to, or contemporaneous with the first time point.

In some embodiments, the radio conditions at the first time point may be obtained by interpolation or extrapolation of measurements of the radio conditions at different times to (for example, times either side of) the first time point. Generally, the skilled person will appreciate that the closer the measurements of the radio conditions are made to the first time point, the more accurately the location information about the actual location of the drone may be made.

In some embodiments, the measurements of radio conditions may comprise radio-measurements related to reference signals sent by the drone. For example, the radio conditions may be obtained from an RSRP report as described above. In this manner, the method may be implemented without additional signaling overhead in order to obtain the measurements of the radio conditions. The radio conditions may thus comprise Reference Signal Received Power (RSRP) measurements, for example, L3-measurements of the RSRP values.

A node (e.g. base station) may generally use reference signals to obtain the measurements of radio conditions. For example, measurements performed by the drone on the beams transmitted by a node, e.g., to assess the quality of the beams. In general, the reference signals transmitted by a node to the drone may comprise at least one of a Channel State Information-Reference Signal (CSI-RS), an SSB, a Primary Synchronization Signal (PSS), a Secondary Synchronization Signal (SSS), and a Cell-specific Reference Signal (CRS). More specifically, a drone may assess beam qualities via measurements on the SSB (e.g., corresponding to a Synchronization Signal/Physical Broadcast Channel (PBCH) block) in a 5G (e.g., NR) network, or via measurements on the CSI-RS resources in a 5G (e.g., NR) network or a 4G (e.g., LTE) network. In embodiments herein, the measurements of the radio conditions may comprise signal quality feedback on the above reference signals, for example the RSRP, SINR, RSRQ, or SINR. The measurements of the radio conditions may also comprise the cell IDs of the cells in range (e.g. an indication of which cells/nodes are in range of the drone). The measurements of the radio conditions may also comprise of the timing advance, or beamforming information such as the precoder index. The measurements of the radio conditions may also comprise of radio signal quality measurements on uplink signal from the drone, e.g. the sounding reference signal (SRS).

In some embodiments the measurement of radio conditions may comprise whether a UE can detect (e.g. has signal from or can communicate with) the node. For example, in step 304 the potential cells (cell IDs) that the drone can detect at a certain location may be obtained.

Turning to block 306, the method then comprises predicting radio conditions at one or more locations related to the reported location of the drone. Generally, the predicted radio conditions may be of the same type (or converted into the same type) as the measurements of radio conditions described above.

In some embodiments in step 306, predicting radio conditions at one or more locations related to the reported location of the drone may comprise predicting the radio conditions using a channel model and deployment information (e.g. the known locations of the node(s) in the network). Using channel models for drones, one can estimate the radio environment of the drone. As an example, radio conditions may be predicted using a channel model such as free-space propagation loss (FSPL). According to FPSL:

$$FSPL=(4\pi d/\lambda)^2,$$

where $\Delta$ is the signal wavelength, and d is the distance between the transmitter and drone reported location. Using the FSPL with antenna and noise powers at the node and drone, e.g. the RSRP for the drone at the reported location for each time instance, or the potential cells (cell IDs) a drone can detect at a certain location can be predicted.

In other embodiments, a model may be determined (e.g. created) to predict radio conditions for different locations. For example, the network may build a radio-signal quality prediction model of the environment that can map drone locations to radio measurements (e.g. RSRP of one or more nodes). The prediction model can be built from legal-drone measurements (e.g. drone measurements that are legally obtained), then create a mapping from a set of drone locations to the radio-measurements. For example, in some embodiments, the method 300 may further comprise obtaining ground truth location measurements and corresponding ground truth measurements of radio conditions at the locations. Such measurements may be obtained from drones (e.g. airborne UEs) that report trusted location information. The measurements can generally be obtained from any terrestrial UE type that reports location information that is trusted such that it can be used as ground truth location information. The measurements may be verifiable, for example. Such measurements may be made using dedicated drones or used to obtain the required ground-truth data (e.g. survey drones), aggregated from drone data available from drones in the field, a combination of the two, or any other available data comprising measured radio conditions at different drone locations.

In some embodiments, the radio conditions may be predicted using a model trained using a machine learning process. For example, the step of predicting radio conditions at one or more locations related to the reported location of the drone may comprise using a model trained using a machine learning process to predict the radio conditions at the one or more locations.

As such, the ground truth data described above may be used as training data to train a machine learning model, for example, in the format (location, radio condition measurements).

The skilled person will be familiar with a wide range of machine learning models that may be trained to predict radio conditions from location information. For example, classification models that may be trained in a supervised manner on training data as described above. Examples, of models that may be used, include but are not limited to, neural networks, decision trees (e.g. random forest algorithms), logistic regression, and linear regression.

The model used to predict the radio conditions can, for example, comprise a recurrent neural network which exhibits a temporal dynamic behavior and can therefore process a sequence of inputs (such as in path). Random forest algorithm can also be used The skilled person will be familiar with neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights and biases associated with the neurons are adjusted until the optimal weightings are found that produce predictions for the training examples that reflect (e.g. optimally predict) the corresponding ground truths.

The skilled person will be familiar with methods of training a neural network using training data (e.g. gradient descent etc.) and appreciate that the training data may comprise many hundreds or thousands of rows of training data, obtained in a diverse range of network conditions.

Generally, the model may have been trained using training data. Each piece of training data comprising: i) an example drone location; and ii) ground truth measurements of radio conditions at the example drone location. The training data may be obtained as described above.

Figure 5:
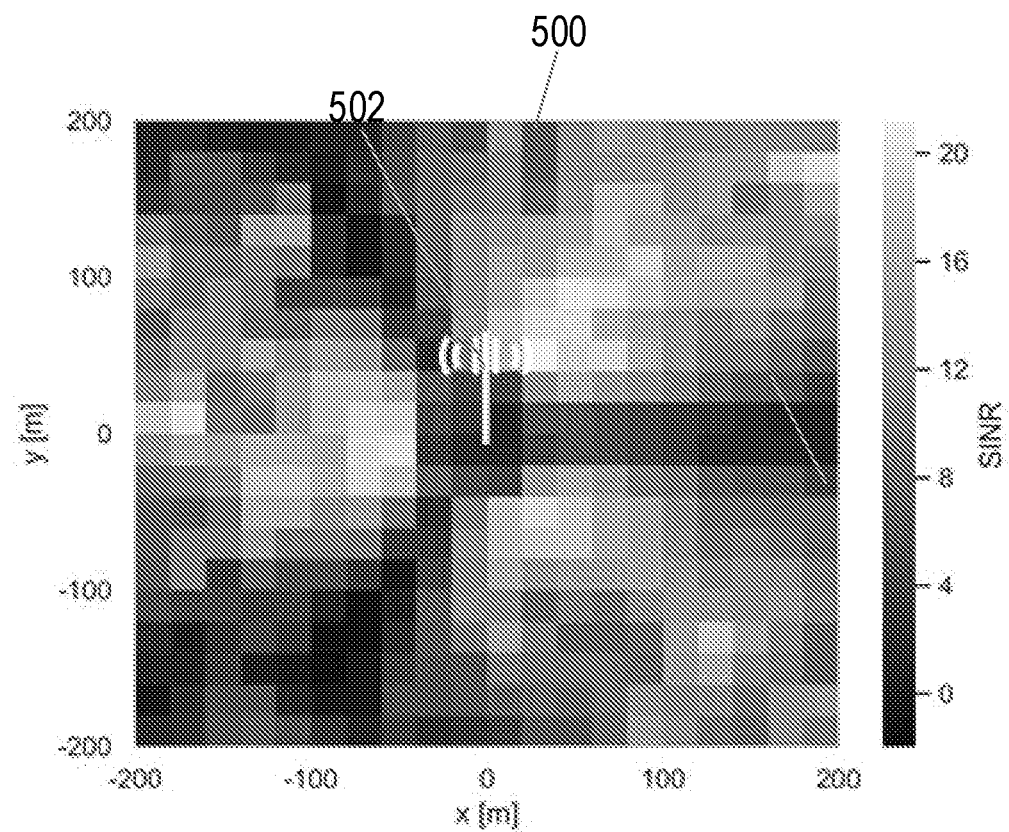
FIG. 5 illustrates an example map of predicted radio conditions according to some embodiments herein.

In some embodiments the model may be trained to take as input a location and output a prediction of the radio conditions for that location. The locations may be time-stamped such that the model further takes as input a time and outputs predicted radio conditions at the specified location for the specified time. The model may be trained to take a plurality or sequence of input locations (for example, along a flight path) and output a prediction of the radio conditions at each point along the flight path. In other embodiments, as described below, the model may be trained to take as input a region and output a map of radio conditions in an area covering the input region. In another example, the neural network may take as input a location and output a map, centred on the input co-ordinates (e.g. for the node in location [0,0]). An example map 500 of the predicted radio conditions surrounding a node 502 is illustrated in FIG. 5 as described below.

In some embodiments, the model may be trained to take as input (one or more) locations and output a plurality of measurements of radio conditions between the drone and each one of a plurality of different nodes in the telecommunications network. As such, the model may predict a "fingerprint" of the radio-conditions that the drone may be expected to experience at the reported location, on links between different nodes and/or on different channels. In a further example, the model may be trained to output a map comprising a plurality of such finger prints at different locations (e.g. each pixel or location point on the map, may be associated with a vector comprising a prediction of the radio conditions at that point between the drone and a plurality of nodes and/or channels).

In some embodiments the model may be trained to take as input one or more locations as obtained in step 302 and one or more corresponding measurements of radio conditions as obtained in step 304 and output a probability that the drone was actually at the specified input location, based on the measurements. In other words the model may further output a probability that the drone is out-of-path.

The skilled person will appreciate that these are examples only and that other forms of input and output parameters are also possible. It will be appreciated that references to location may generally relate to three dimensional coordinates, including, for example, altitude. Examples of other inputs include but are not limited to the time of day and/or a serving cell ID.

Over time, due to external changes in the environment, the trained model performance can degrade. Hence, updating/re-training of the model may be performed. In some embodiments, the model may be updated periodically. Based on the deployment location, traffic and/or other external changes, an operator may decide a period after which the model may be updated/re-trained irrespective of the model performance. Training data for such update can be collected, for example, by flying operator-owned drones in the given coverage area.

In another embodiment, a training update could be performed aperiodically/on ad-hoc basis. If the number of drones estimated to be out-of-path by a given model over a given period of time is above a threshold, this may indicate that the accuracy of the model should be verified and that model the model could be verified/updated. The threshold value can be set by the network operator and may comprise a tradeoff between network performance (e.g., detecting out of path drones) and complexity (e.g., model update). In such scenarios, the performance of the model could be monitored based on a quality metric, for example, as noted above, the number of drones detected to be out-of-path over a given period, and updated accordingly. Another metric could be the impact that the out-of-path drones are causing on the performance of the ground network. For example, in case out-of-path drones aim at disrupting the ground communication network by generating high interference level, the network can set an interference threshold value as a metric for model update.

In another embodiment, the model could be continuously updated by using ground-truth data collected from trusted drones that typically fly over the area, e.g. a delivery drone that follows same route every day.

In embodiments where the prediction in step 306 is performed by a trained machine learning model (e.g. AI model) the model may be located in different nodes of the network. For example, the model can be located in a core node, for example, a Mobile Management Entity (MME). In embodiments where the method 300 is performed in the node serving the drone, then the serving node may need to signal the out-of-path detection to a neighboring node at handover. This may be performed since the out-of path detection may be relevant for a longer time (e.g. if the drone does not immediately correct its trajectory), and multiple nodes may serve the drone during its flight. Such out-of-path signalling between nodes at handover may comprise, for example:

A drone reported flight-track
A probability of the drone being out-of-path
Similarities between reported and estimated radio measurements of the previous time steps
An estimated location of the drone
An estimated flight-track of the drone In such embodiments, the serving node and neighboring nodes may check similarities between their corresponding out-of-path detection result and compare accordingly. In other words, cross-checking may be performed between different nodes. For example, the method 300 may be performed on a serving node and separately on a neighbouring node and the outputs (e.g the location information about the actual location of the drone) may be compared. The serving node may, for example, calculate a similarity metric between its outcome and the reported outcome from neighboring nodes. Such a similarity check scheme may be used to overcome false outcome reporting from a false/compromised node that can signal a wrong out-of-path signal report to a neighboring node at handover.

In other embodiments where the prediction in step 306 is performed by a trained machine learning model (e.g. AI model), the model may be located in a cloud or distributed computing arrangement, e.g outside the core network and control drone management functions. In other words, the method 300 may be performed in the cloud or other distributed computer arrangement. If the reported location of the drone is sent to the cloud in step 302, the network measurement data may be sent there also in step 304, and the model may be built and maintained directly in the cloud.

Turning now to step 308 in FIG. 3, generally, the prediction may be made in order to determine whether the conditions that we would expect (e.g. predict) if the drone were actually at the location it had reported, match the measured conditions at the actual location of the drone. In this way it can be determined whether the drone is at the location that it reported.

Thus, step 308 may comprise comparing the measured radio conditions and the predicted radio conditions. The location information may then comprise a determination of whether the drone has deviated from the reported location, based on the comparison. In some examples, the step of predicting 306 radio conditions may comprise predicting radio conditions at the reported location of the drone. For example, it may be determined in step 308 that the drone has deviated from the reported location if the measured radio conditions deviate from the predicted radio conditions (e.g., by more than a threshold amount or by more than a statistically significant level). In this manner location information about the actual location of the drone may be provided that indicates whether the drone is out-of-path or not.

Figure 4:
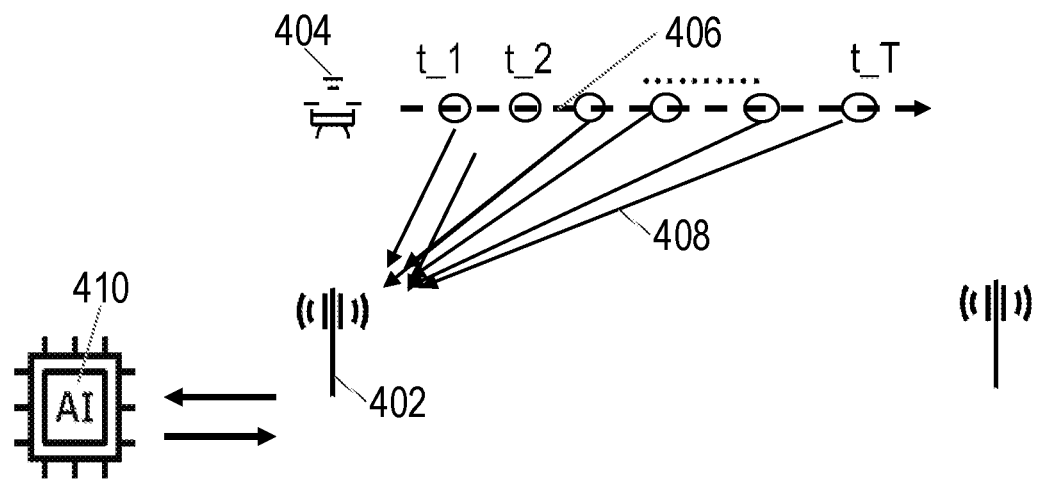
FIG. 4 illustrates an example method according to some embodiments herein.

This is illustrated in FIG. 4 which shows a node 402 connected to a drone 404. The drone 404 reports location data along a flight path 406 at a first time point t1, a second time point t2 and subsequent time points tT as illustrated by the circles along the dashed flight path 406. An out out-of-path determination may be made for the drone 404 using the method 300 above. The reported locations and corresponding measurement conditions between the drone 404 and node 402 are obtained 302, 304 via drone reporting 408. In step 306, radio conditions are predicted at the locations (t1, t2, ..., tT) using a model 410 trained according to any of the processes described above. In step 308, the predicted conditions are compared to the radio conditions as measured by the drone (e.g. the drone reported radio measurements 408).

Thus, in step 308, If the measured radio conditions are similar to the predicted conditions, e.g. within a threshold amount, then it may be determined that a drone 404 has accurately reported its location. If the measured radio conditions deviate from the predicted conditions, e.g. by more than a threshold amount, then it may be determined that the drone 404 has inaccurately reported its location. E.g. an out-of-path determination may be made for the drone.

As described above, in some embodiments, a plurality of radio conditions are obtained (e.g. from different nodes/channels) in step 302 and a plurality of radio conditions are predicted for the reported location of the drone in step 306, e.g. measured and predicted "fingerprints" are obtained as described above. For example, a drone that has reported radio measurements [r1, r2, ... rN] at time t1 (r1 may correspond to the SINR for one node according to FIG. 4), the node can determine the similarity s_1 of the reported measurements with the predicted [(r_1)^,r_2, ... r_N], for example, by determining the Euclidian distance and using a threshold Euclidian distance to determine that the drone is out of path.

Alternatively, for example, an out-of-path determination may be made based on a statistical measure such as whether the average/max/min of the differences between the predicted and measured radio conditions are above a certain threshold.

Put more generally, in some embodiments, in step 308 the method may comprise calculating a similarity metric between one or more pairs of measurements of radio conditions and predicted radio conditions. The measurements of the radio conditions and predicted radio conditions may represent different time points and/or be between the drone and different nodes in the network.

In some embodiments, a similarity metric may be compared to a threshold to determine whether the drone is out-of-path.

In other embodiments, the method may comprise providing one or more similarity metrics to a second model trained using a machine learning process. Such a model may comprise any of the types of models described above with respect to the models used in step 306 (e.g. neural network, random forest etc). In some embodiments a classification is performed. The output may comprise a binary indication of drone following path/not following path, or a probability that the drone is out of path. The input may thus comprise a set of similarity metrics for each T locations, and the output may comprise a probability of an out of path-detection.

As an example, in embodiments where, in step 302, a sequence of T locations are reported at a sequence of T time points, and in step 304 a corresponding sequence of radio condition measurements are obtained, the T samples may then be forwarded to a second model that inputs the set of T samples and outputs a probability that the drone is out-of-path.

The second model may be trained using training data comprising example sets of similarity metrics and ground truth indications of whether the drone is out of path, or not. Use of a second model in this manner can enable scenario specific combination of similarities in order to detect whether a drone is following its reported path. Since one combination of similarities might not be adequate for all scenarios. Such a model may be able to apply different criteria for different locations. E.g. instead of applying a single measure of difference (e.g. a single Euclidean distance threshold), the model may be able to effectively learn different thresholds for different locations and/or different combinations of the similarity metrics. Effectively therefore, it may facilitate much more granular determinations of whether a drone is out of path.

In such embodiments, the second model may be located in the cloud, whilst the model may be distributed in a different area of the network, for example, between the network node (e.g. MME) and the location of the second model. For example, a machine learning model may be used to predict the sequence of radio conditions in step 306 in a network node (e.g. the node serving the drone). The serving node may then compare the measured radio conditions and the predicted radio conditions, for example, to determine T measures of similarity between the measured radio conditions and the predicted radio conditions. The results may then be sent to the second model in the cloud. The previously mentioned aggregation of the T similarities can be performed in the second model to take final decision. During inter-node handover of the drone, the nodes participating in the handover can communicate between themselves to continue sending data to the second model. On other hand, the initiating (e.g. serving) node can send the information to the second model regarding handover and the information of the target node and the second model can decide to inform the target node to keep sending data.

Figure 6:
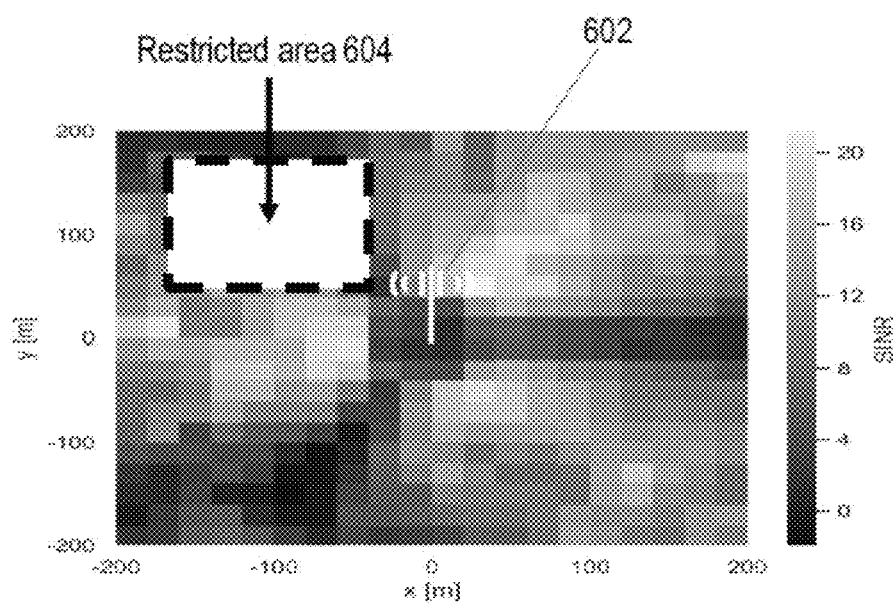
FIG. 6 illustrates a further example map of predicted radio conditions, illustrating a no-fly zone, according to some embodiments herein.

Turning now to other embodiments, determining location information about an actual location of a drone may comprise determining whether the drone is flying in a no-fly zone (e.g. flying in restricted airspace, or some other space that the drone should not be flying in, such as over an airport). For such regions, training data may not be obtainable, if drones are not permitted to fly into the no-fly zone to collect such training data. As such, in embodiments where the predicting in step 306 is performed using a machine learning model, the model should not be able to predict the radio conditions in the no-fly zone, if no training data is available for it. This is illustrated in FIG. 6 which shows a predicted map of radio conditions in the vicinity of a node 602 that includes a restricted area 604 for which no predictions can be made. In such scenarios, anomaly detection can be used for estimating the similarity between the received samples and the samples from the training data collection of the legal drones.

For example, in some embodiments, in step 308, the method may comprise determining that the actual position of the drone is in a no-fly zone if the measured radio conditions are inconsistent with (e.g. statistically inconsistent with) the predicted radio conditions. In particular, if the measured radio conditions are inconsistent (e.g. differ by more than a predetermined threshold amount) with all predicted conditions.

In embodiments where a plurality of radio conditions are obtained (e.g. from different nodes/channels) in step 302 and a corresponding plurality of radio conditions are predicted for the reported location of the drone in step 306 (e.g. measured and predicted "fingerprints"), the measured fingerprint may be inconsistent with a predicted fingerprint (or predicted fingerprints for different locations) if the measured fingerprint has a different pattern of radio conditions compared to the predicted fingerprints. The measured fingerprint may be inconsistent with a predicted fingerprint (or predicted fingerprints for different locations) if the measured fingerprint has a different pattern of radio conditions compared to the predicted fingerprints, such that it is statistically unlikely (e.g. taking the errors on the measurements and predictions into account) that the measured fingerprint is found amongst the predicted fingerprints.

In the scenario shown in FIG. 6, an anomaly may be detect if e.g. the SINR were outside the range of the other locations. That is according to the example of FIG. 6, if SINR >25 dB or SINR <−5 dB. Note that radio measurements from more than one node lead to more accurate detections.

Turning now to other examples, in some embodiments, the step of obtaining 304 a measurement of radio conditions comprises obtaining a sequence of measurements of radio conditions between a node in the telecommunications network and the drone, the sequence of measurements being made at a sequence of locations (and thus a sequence of time points) along a flight path as reported by the drone. The step of determining 308 the location information may then comprise determining an actual flight path of the drone by pattern matching the obtained sequence of measurements of radio conditions to patterns in the predicted radio conditions at the one or more locations related to the reported location of the drone.

For example, as described above, in some embodiments, the predicted radio conditions may comprise a map of radio conditions which covers an area that includes the flight path as reported by the drone. This is illustrated in FIG. 5 which shows predictions of the radio conditions 500, e.g. signal quality at different locations around a node 502 with 3 sectors, at 100 meters altitude. Accordingly, predicted radio conditions along the reported flight path of the drone may be matched to patterns in such a map in order to determine the actual locations/flight path of the drone.

Figure 7:
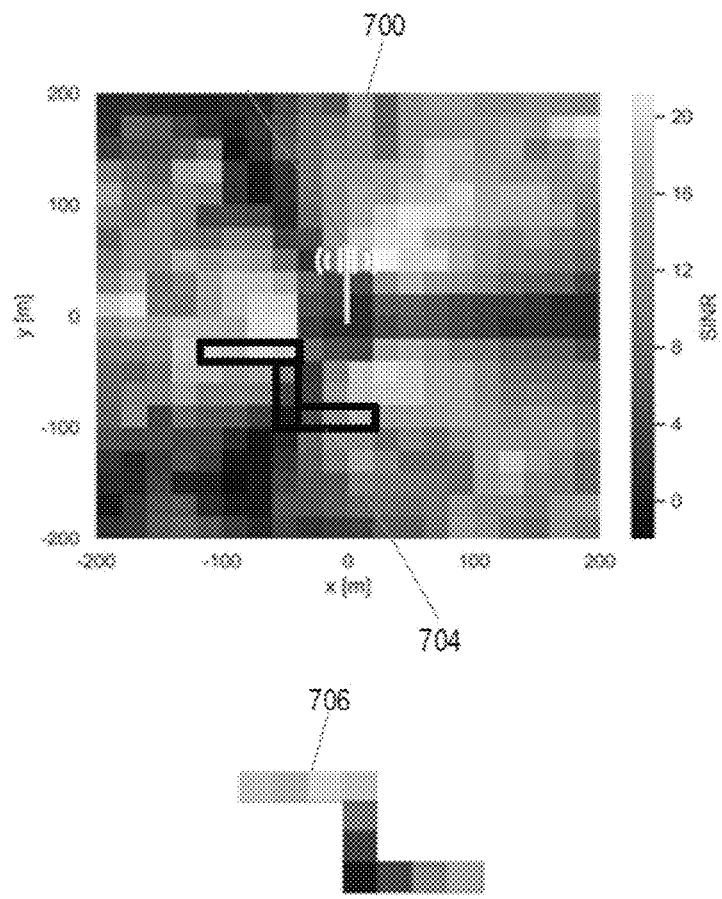
FIG. 7 illustrates how a predicted map of radio conditions may be used to determine an actual flight path according to some embodiments herein.

This is illustrated in FIG. 7 which shows a trajectory of a reported flight path 706, colour coded according to the obtained measurements of radio conditions at each point. The spatial pattern and pattern in the measured radio conditions can be compared to the predicted patterns in the map of predicted radio conditions 700 to determine the drone's actual flight path 704 through the region.

A machine learning algorithm (e.g., convolutional neural network) can be used for performing pattern recognition using a method that is analogous to image recognition by relying on an offline radio signal map in the same area in which the drone is flying (as shown in FIG. 7). This may in turn enable the network to classify whether the reported future location of the drone at given time stamps is expected or anomalous.

The skilled person will be aware of other pattern matching techniques that could also be used, such as for example, fuzzy matching, deep learning and/or genetic algorithms.

Using pattern recognition techniques enables the network to not only detect an out-of-path drone, but also to determine the most likely route the drone is using. In this way the location information may comprise the actual location or flight path of the drone (e.g. not only an estimate of whether the drone is out-of-path or not).

Turning to another embodiment, the method 300 may comprise obtaining ground truth measurements of the radio conditions at different drone locations (e.g. obtained from drones or UEs). The ground truth measurements may be used to train a model using a machine learning process to predict radio conditions for different drone locations. In inference, the method then comprises obtaining 302 a reported location of a new drone at a first time point. The method may then comprise obtaining 304 a measurement of radio conditions between the new drone and a node in the telecommunications network, at the first time point. In this embodiment, the method 300 then comprises providing the obtained reported location as input to the model. The model then provides as output a prediction 306 of the radio conditions at the reported location of the new drone. In step 308 the measured radio conditions are compared to the predicted radio conditions in order to determine whether the new drone is out-of-path.

Once the location information about the actual location of the drone has been obtained, e.g. according to the method 300 above, if it is determined that the drone has reported an inaccurate location (e.g. if an out-of-path detection is made), the drone can be warned, requested to return to ground level, or disconnected from the network. The warning could possibly indicate a time when the connection will be terminated, enabling the drone to first adjust its path to the reported one. Generally therefore, if the location information indicates that the drone has deviated from the reported location of the drone, the method 300 may further comprise: sending a message to the drone, the message comprising one of i) a warning to the drone that it has deviated from its reported location; ii) a request that the drone returns to ground-level; and iii) an indication that the drone will be disconnected from the communications network if it fails to alter its flight trajectory. The method may further (or alternatively) comprise disconnecting the drone from the communications network.

Thus in this manner, out-of-path drone detection may be performed. False path reporting (whether intentional or otherwise) can result in: disruption to the ground communication network by causing high interference in the uplink if the drone flies at specific locations. Drones flying in "no fly" zones such as airports may disrupt the communications network in such neighbourhoods or result in the capture (by the drone) of sensitive videos or other information. As noted above, drones may also report false location information to enable them to fly an altitudes above or below the permitted limits, or faster than is actually permitted. Thus the methods and nodes herein may be used to detect and put a stop to such activities. The methods herein may further be used to help a drone steer back to its correct course, if it unintentionally deviates from its reported location route, for example, due to inaccurate GNSS locations, for example, due to jammers, or canyoning effects with high-rise buildings. Furthermore, methods herein enable out of path drone detection to be performed using standard signalling, e.g. without any incurring additional signalling burden to the network.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of the method 300 described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or node may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method in a communications network for determining location information about an actual location of a drone, the method comprising:
   obtaining a reported location of the drone at a first time point;
   obtaining a plurality of measurements of radio conditions between the drone and a serving node in the communications network, at the first time point;
   predicting radio conditions at one or more locations related to the reported location of the drone; and
   determining the location information about the actual location of the drone based on the measured radio conditions and the predicted radio conditions, wherein if the location information indicates that the drone has deviated from the reported location of the drone, the method further comprises sending a message to the drone, the message comprising a request that the drone returns to ground-level; and
   determining a false location information reporting associated with the drone by the serving node during a handover, comprising:
      determining a first similarity metric between the predicted radio conditions and the measured radio conditions at the serving node;
      determining a second similarity metric between second predicted radio conditions and second measured radio conditions with respect to the drone at a neighboring cell associated with a neighboring node;
      comparing the first similarity metric with the second similarity metric; and
      determining a deviation between the first similarity metric and the second similarity metric.

2. The method as in claim 1 wherein the location information about the actual location of the drone is determined based on a comparison between the measured radio conditions and the predicted radio conditions.

3. The method as in claim 2 wherein the step of predicting radio conditions comprises:
   predicting radio conditions at the reported location of the drone; and
   wherein the step of determining the location information comprises: determining whether the drone has deviated from the reported location, based on the comparison.

4. The method as in claim 3 comprising: determining that the drone has deviated from the reported location, if the measured radio conditions deviate from the predicted radio conditions by more than a threshold amount.

5. The method as in claim 1 wherein obtaining the measurement of radio conditions comprises:
   obtaining a sequence of measurements of radio conditions between the node in the communications network and the drone, the sequence of measurements being made at a sequence of locations along a flight path as reported by the drone; and
   wherein the step of determining the location information comprises: determining an actual flight path of the drone by pattern matching the obtained sequence of measurements of radio conditions to patterns in the predicted radio conditions at the one or more locations related to the reported location of the drone.

6. The method as in claim 5 wherein the predicted radio conditions comprise a map of radio conditions that covers an area that includes the flight path reported by the drone.

7. The method as in claim 1, wherein the measured radio conditions comprise the plurality of measurements of radio conditions between the drone and each one of a plurality of different nodes in the communications network.

8. The method as in claim 1, further comprising:
   determining that the actual position of the drone is in a no-fly zone if the measured radio conditions are inconsistent with the predicted radio conditions.

9. The method as in claim 1, wherein the step of predicting radio conditions at one or more locations related to the reported location of the drone comprises:
   predicting the radio conditions using a channel model and deployment information.

10. The method as in claim 1, wherein the step of predicting radio conditions at one or more locations related to the reported location of the drone comprises:
    using a model trained using a machine learning process to predict the radio conditions at the one or more locations.

11. The method as in claim 10 wherein the model has been trained using training data, wherein each piece of training data comprises: i) an example drone location; and ii) ground truth measurements of radio conditions at the example drone location.

12. The method as in claim 10 wherein the model comprises a neural network or a random forest model.

13. The method as in claim 1, wherein if the location information indicates that the drone has deviated from the reported location of the drone, the method further comprises:
    sending a message to the drone, the message comprising one of i) a warning to the drone that it has deviated from its reported location; and ii) an indication that the drone will be disconnected from the communications network if it fails to alter its flight trajectory; and/or
    disconnecting the drone from the communications network.

14. The method as in claim 1 wherein the method is performed by a base station, network node or network function node in the communications network.

15. The method as in claim 1, wherein the method is performed in a distributed manner, or in a cloud.

16. A node in a communications network for determining location information about an actual location of a drone, wherein the node comprises a memory comprising instruction data representing a set of instructions; and
    a processor configured to communicate with the memory and to execute the set of instructions, wherein the set of instructions, when executed by the processor, cause the processor to:
    obtain a reported location of the drone at a first time point;
    obtain a plurality of measurements of radio conditions between the drone and a serving node in the communications network, at the first time point;
    predict radio conditions at one or more locations related to the reported location of the drone; and
    determine the location information about the actual location of the drone based on the measured radio conditions and the predicted radio conditions, wherein if the location information indicates that the drone has deviated from the reported location of the drone, the method further comprises sending a message to the drone, the message comprising a request that the drone returns to ground-level; and
    determine a false location information reporting associated with the drone by the serving node during a handover, wherein the processor configured to determine the false location information reporting associated with the drone by the serving node during the handover is further configured to:
    determine a first similarity metric between the predicted radio conditions and the measured radio conditions at the serving node;
    determine a second similarity metric between second predicted radio conditions and second measured radio conditions with respect to the drone at a neighboring cell associated with a neighboring node;
    compare the first similarity metric with the second similarity metric; and
    determine a deviation between the first similarity metric and the second similarity metric.

17. A non-transitory computer readable medium, the computer readable medium having computer readable code embodied therein, the computer readable code being configured such that, on execution by a computer or processor, the computer or processor is caused to perform the method as claimed in claim 1.

* * * * *